United States Patent [19]
Toyama et al.

[11] 3,870,911
[45] Mar. 11, 1975

[54] WHEEL SPEED DETECTOR FOR VEHICLES

[75] Inventors: Koichi Toyama; Koichi Taniguchi, both of Kariya, Japan

[73] Assignee: Nippondenso Co., Ltd., Kariya-shi, Aichi-ken, Japan

[22] Filed: June 19, 1973

[21] Appl. No.: 371,499

[30] Foreign Application Priority Data
June 21, 1972 Japan.............................. 47-73919

[52] U.S. Cl................................. 310/155, 324/174
[51] Int. Cl............................................. H02k 17/42
[58] Field of Search ............ 324/173, 174; 310/155, 310/168, 169, 170

[56] References Cited
UNITED STATES PATENTS

| | | | |
|---|---|---|---|
| 3,500,091 | 3/1970 | Jones | 324/174 |
| 3,604,966 | 9/1971 | Liggett | 310/168 |
| 3,626,226 | 12/1971 | Pauwels | 310/168 |
| 3,649,859 | 3/1972 | Watt | 310/168 |
| 3,651,901 | 3/1972 | Burckhardt | 324/174 |
| 3,652,886 | 3/1972 | Riordan | 310/168 |

*Primary Examiner*—Michael J. Lynch
*Attorney, Agent, or Firm*—Cushman, Darby & Cushman

[57] ABSTRACT

A wheel speed detector for vehicles in which a stator including a coil and a magnet is secured to a stationary plate which is fitted coaxially to an axle or an axle housing so that the stator can be readily positioned coaxially with respect to the axle. The stator is also disposed between a wheel hub and a brake disc and serrations are provided on either the wheel hub or the brake disc in an opposite relation to the stator so that an alternating current is produced in the coil with a frequency correspsonding to the rotational speed of the wheel and thus the rotor.

1 Claim, 5 Drawing Figures

WHEEL SPEED DETECTOR FOR VEHICLES

The present invention relates to a speed detector for a vehicle such as an automobile and more particularly to a speed detector in which speed of a wheel is detected to obtain vehicle speed.

Conventionally, a speed detector of the aforementioned type usually comprises an electromagnetic pick up mounted on a calliper of a disc brake provided on a wheel and a serrated portion provided on the outer periphery of a brake disc of said disc brake. Thus, as the brake disc is rotated, an alternating current is produced in the electromagnetic pick up with a frequency proportional to the rotating speed of the wheel. In this known arrangement, it is particularly important to maintain a uniform clearance between the electromagnetic pick up and the serrated portion on the brake disc, because any change in the clearance causes a remarkable change in the output of the pick up. However, in the known arrangement, since the electromagnetic pick up is mounted on the calliper of the disc brake, it is very difficult to locate the pick up against the serrated portion on the brake disc.

Further, it has also been known to provide a serrated portion on the outer periphery of a drive axle of a wheel and mount an electromagnetic pick up on a back plate which is secured to a stationary axle housing encircling the drive axle. In this arrangement, too, it is very difficult to exactly locate the pick up against the serrated portion on the axle.

Therefore, it is an object of the present invention to eliminate the aforementioned problems of the known arrangements.

Another object of the present invention is to provide a speed detector in which a uniform clearance can be maintained between an electromagnetic pick up and a serrated portion.

A further object of the present invention is to provide a speed detector of the aforementioned type in which any adjustment of the clearance between an electromagnetic pick up and a serrated portion is required.

According to the present invention, the above objects can be achieved by a speed detector for a vehicle, comprising an electric power generating means secured to a stationary plate and including permanent magnet means and coil means, means for fitting said stationary plate at the inner periphery thereof coaxially to an axle of a wheel, and a rotatable means constituted by a magnetic material and having a plurality of serrations disposed against the generating means.

The above and other objects and features of the present invention will become apparent from the following descriptions of preferred embodiments shown in the accompanying drawings, in which.

Figure 1:
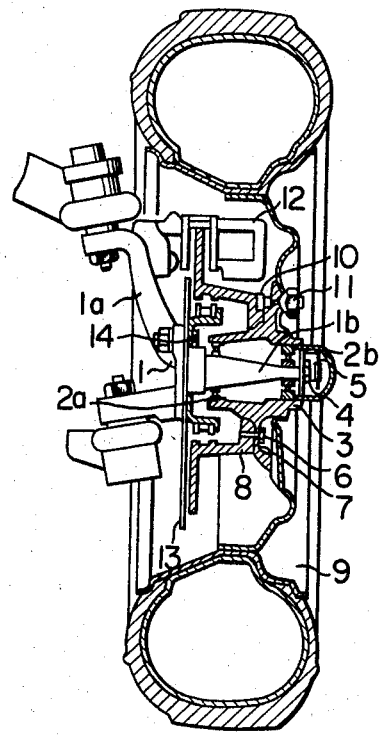
FIG. 1 is a vertical sectional view of one embodiment of the present invention.
Figure 2:
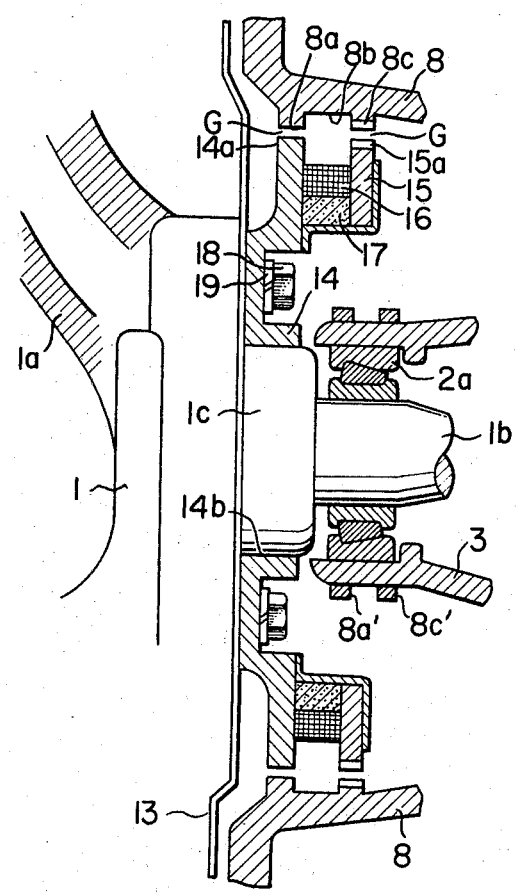
FIG. 2 is a fragmentary sectional view of the embodiment shown in FIG. 1.

Referring to the drawings, particularly to FIGS. 1 and 2, there is shown a steerable wheel of a vehicle embodying the present invention in which the reference numeral (1) designates a steering knuckle having an arm (1a) and an axle (1b). The arm (1a) is connected with a steering mechanism (not shown) and the axle (1b) supports an axle hub (3) through bearings (2a) and (2b). The axle hub (3) is retained against axial displacement by means of a nut (4) and a retaining pin (5). A brake disc (8) is secured to the axle hub (3) by means of bolts (6) and spring washers (7). The axle hub (3) has a plurality of studs (10) secured thereto for mounting a wheel (9) by means of corresponding number of nuts (11). A brake calliper (12) is mounted on the steering knuckle (1) by means of bolts and nuts (not shown). The reference numeral (13) designates a dust cover. The brake disc (8) has an inner periphery having a smooth surfaced land (8a) confronting with the axle hub (3), and a serrated land (8c) separated from the smooth land (8a) by means of a groove (8b). A plate (14) is mounted on the steering knuckle (1) by being fitted at its inner periphery (14b) to the enlarged portion (1c) on the axle (1b) and secured thereto by a plurality of bolts (18) and spring washers (19). The plate (14) has a smooth outer peripheral surface (14a) which is positioned opposite to the land (8a) with a gap (G) therebetween. The plate (14) further carries an annular plate (15) having a serrated outer periphery (15a) which is positioned opposite to the serrated land (8c) with a gap (G) therebetween. Between the plates (14) and (15), there is diposed an annular coil (16) and an annular permanent magent (17) which constitute an electric power generating means. Thus, it should be noted that, in the above arrangement, a magnetic circuit is formed from the magnet (17) through the plate (15), the serrated outer periphery (15a) of the plate (15), the gap (G), the serrated land (8c) on the brake disc (8), the smooth land (8c) on the brake disc (8), the gap (G) and the plate (14) again to the magnet (17). Therefore, as the brake disc (8) is rotated together with the axle hub (3), a cyclic change is produced in the magnetic resistance at the gap (G) between the serrated land (8c) on the brake disc (8) and the serrated periphery (15a) on the stationary plate (15), so that an alternating current is produced in the coil with a frequency corresponding to the speed of the wheel. Since the plate (14) is positioned on the axle portion (1b) by fitting its inner periphery (14b) to the enlarged portion (1c) on the axle, the outer periphery (14a) of the plate (14) as well as the serrated periphery (15a) of the plate (15) can be positioned in exact coaxial relationship with the axle (1b). Therefore, the peripheries (14a) and (15a) can be positioned coaxially with the lands (8a) and (8c) with uniform gaps (G) therebetween. In the aforementioned arrangement, the lands (8a) and (8c) may be omitted and similar lands may be provided on the outer periphery of the axle hub (3) as shown by (8a') and (8c') in FIG. 2. In such a case, the stationary plate (14) may be modified so that the peripheries (14a) and (15a) are positioned in opposite relation with the lands (8a') and (8c'). Further, it should also be noted that the arrangement may be so modified that it is applied to a wheel having a drum type brake.

Figure 3:
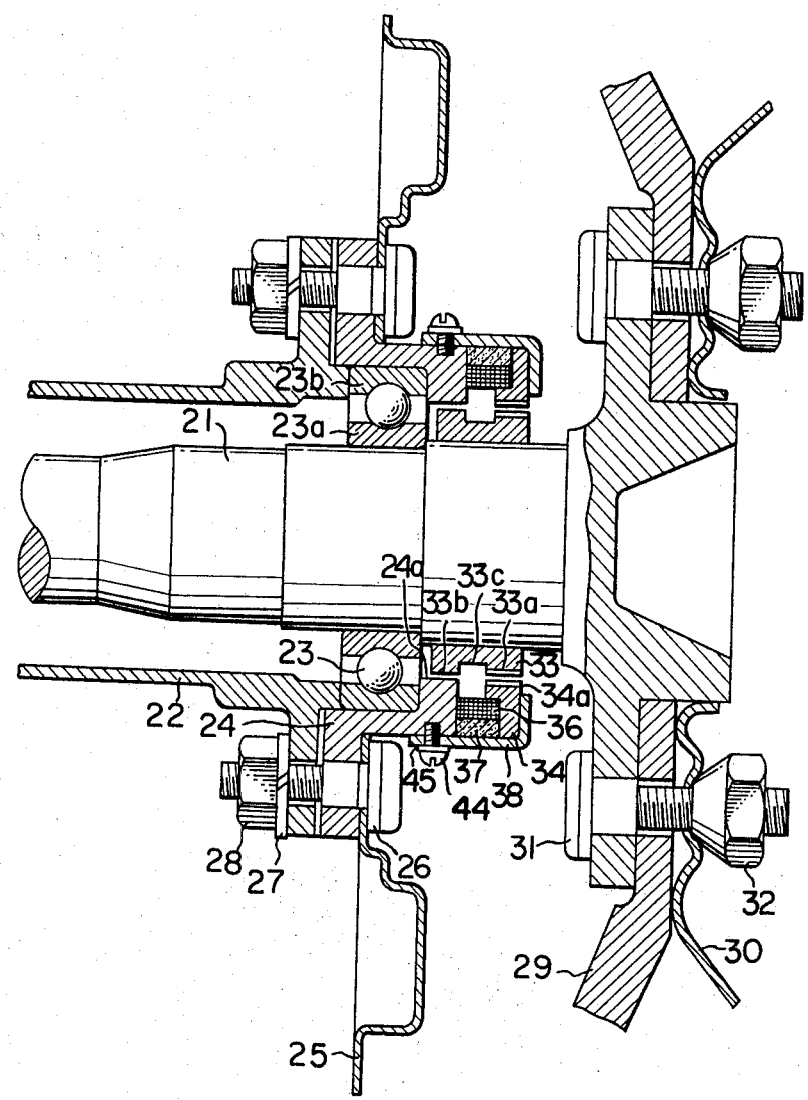
FIG. 3 is a fragmentary sectional view showing another embodiment of the present invention.

Referring now to FIG. 3 which shows another embodiment of the present invention, a power driven axle (21) is rotatably supported in an axle housing by a bearing (23) having an inner race (23a) and an outer race (23b). The bearing (23) is secured in position by an annular bearing holder (24) which secured together with a back plate (25) to the axle housing (22) by a plurality of bolts (26), washers (27) and nuts (28). At the outer end of the axle (21), there is mounted a brake drum (29) and a wheel (30) by means of a plurality of bolts (31) and nuts (32).

On the axle (21), there is mounted an annular member (33) having a serrated land (33a) and a smooth land (33b) which is separated from the land (33a) by an annular groove (33c). The bearing holder (24) has an inner periphery (24a) which confronts to the smooth land (33b). Further, the bearing holder (24) carries a stator (34) which has an inner serrated periphery (34a). The periphery (34a) is positioned in confronting relationship with the serrated land (33a) on the rotor or member (33). Between the bearing holder (24) and the stator (34), there are disposed an annular coil (36) and an annular permanent magnet (37) which are held in position by a cylindrical member (38) secured to the bearing holder (24) by means of screws (44) and washers (45).

In operation, as the axle (21) and the wheel (30) are rotated, the rotor (33) is simultaneously rotated with respect to the bearing holder (24) and the stator (34). Thus, there is produced in the coil (36) an alternating current having a frequency corresponding to the speed of rotation of the wheel.

Figure 4:
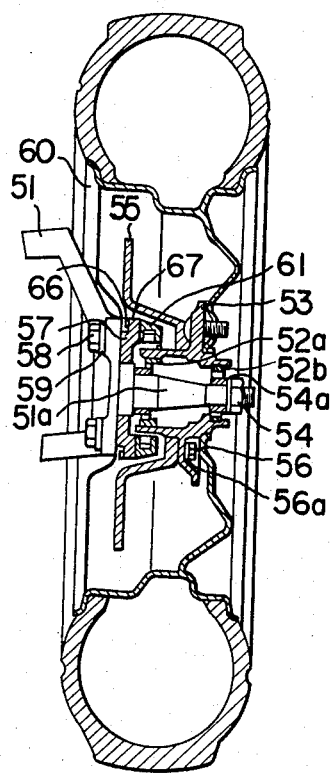
FIG. 4 is a vertical sectional view showing a further embodiment of the present invention.
Figure 5:
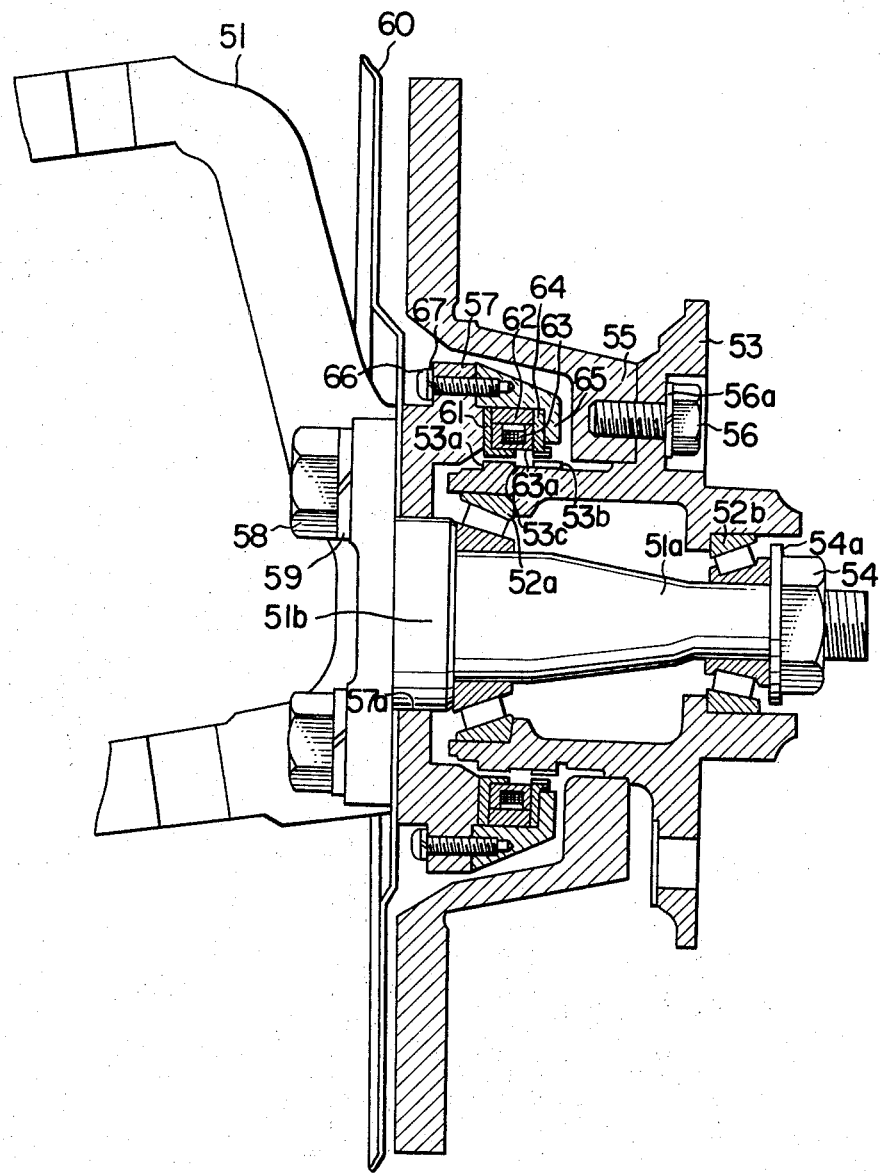
FIG. 5 is a fragmentary sectional view of the embodiment shown in FIG. 4.

Referring further to FIGS. 4 and 5, there is shown another embodiment of the present invention in which the invention is applied to a steerable wheel of a vehicle. In the drawings, the reference numeral (51) designates a steering knuckle having an axle portion (51a) on which a hub (53) is rotatably mounted by means of bearings (52a) and (52b). The bearing (52b) is axially retained on the axle portion (51a) by a nut (54) and a spring washer (54a) so that any axial displacement of the hub (53) is effectively prevented. A brake disc (55) is mounted on the hub (53) by a plurality of bolts (56) and spring washers (56a). The axle (51a) is formed with an enlarged portion (51b) at the root end thereof and a brake calliper retaining member (57) is fitted at its inner periphery (57a) on the enlarged portion (51b) of the axle (51a). The retaining member (57) serves to carry a brake calliper of a disc brake system and is secured to the steering knuckle (51) by a plurality of bolts (58) and washers (59) together with a dust cover (60). The hub (53) is made of a magnetic material and has a cylindrical portion provided at its outer surface with a smooth surfaced land (53a) and a serrated land (53b) which is separated from the land (53a) by an annular groove (53c). The retainer member (57) carries by means of a holder (65) an electric power generating means comprising an annular stator (61) made of a magnetic material, an annular magnet (62), a coil (63) wound on a core (63a) and a second annular stator (64) made of a magnetic material. The stator (61) has a smooth inner periphery opposing to the smooth land (53a) while the stator (64) has a serrated inner periphery opposing to the serrated land (53b). The holder (65) is secured to the calliper retaining member (57) by a plurality of screws (66) and washers (67).

In operation, as the hub (53) rotates, the lands (53a) and (53b) are moved with respect to the coil (63) so that an alternating current is produced in the coil (63) with a frequency corresponding to the speed of rotation of the wheel hub (53).

From the above descriptions, it will be understood that the present invention provides a novel speed dectector in which a stator or a generator section can be conveniently positioned with respect to a rotor by providing means for fitting the generator section co-axially with respect to an axle of a wheel.

The present invention has thus been shown and described with respect to particular embodiments, however, it should be noted that the invention is in no way limited to the details of the illustrated structures but various changes and modifications may be made without departing from the scope of the appended claims.

We claim:

1. A wheel speed detector for vehicles comprising: a non-rotatable axle, a wheel hub coaxially rotatably mounted on said axle through bearings, said wheel hub being made of magnetic material, brake disc means connected to the outer periphery side of said wheel hub in a coaxially rotatable relation to said axle, a stationary plate directly snugly fitted on the outer peripheral surface of said axle in a coaxial relation therewith, electric power generating means secured to said stationary plate and disposed in an enclosure defined by the outer surface of said wheel hub and the inner surface of said brake disc means, said generating means including annular coil means with its turns forming concentric circles with respect to said axle and annular permanent magnet means disposed around the outer periphery of said coil means, and a plurality of serrations disposed in an opposite relation with respect to said generating means and directly provided on the outer peripheral surface of said wheel hub.

* * * * *